(12) United States Patent
Vangal-Ramamurthy

(10) Patent No.: US 8,135,208 B1
(45) Date of Patent: Mar. 13, 2012

(54) CALIBRATED VISION BASED ROBOTIC SYSTEM UTILIZING UPWARD AND DOWNWARD LOOKING CAMERAS

(75) Inventor: Jambunathan Vangal-Ramamurthy, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 663 days.

(21) Appl. No.: 12/354,506

(22) Filed: Jan. 15, 2009

(51) Int. Cl.
*G06K 9/00* (2006.01)

(52) U.S. Cl. ........ 382/153; 382/151; 382/154; 700/259; 700/254; 348/E17.002

(58) Field of Classification Search ............... 382/151, 382/153, 154; 700/259, 245; 348/E17.002
See application file for complete search history.

(56) References Cited

U.S. PATENT DOCUMENTS

| 3,007,097 A | 10/1961 | Shelley et al. |
| 4,362,977 A | 12/1982 | Evans et al. |
| 4,460,826 A | 7/1984 | Pryor |
| 4,570,065 A | 2/1986 | Pryor |
| 4,753,569 A | 6/1988 | Pryor |
| 4,831,549 A | 5/1989 | Red et al. |
| 4,908,777 A | 3/1990 | Wolfe |
| 5,083,073 A | 1/1992 | Kato |
| 5,706,408 A | 1/1998 | Pryor |
| 5,821,993 A | 10/1998 | Robinson |
| 6,044,308 A | 3/2000 | Huissoon |
| 6,070,109 A | 5/2000 | McGee et al. |
| 6,078,846 A | 6/2000 | Greer et al. |
| 6,138,494 A | 10/2000 | Lee et al. |
| 6,507,992 B1 | 1/2003 | Jenkins et al. |
| 6,594,600 B1 | 7/2003 | Arnoul et al. |
| 6,816,755 B2 | 11/2004 | Habibi et al. |
| 6,852,007 B1 | 2/2005 | Gonzalez-Martin et al. |
| 7,043,334 B2 | 5/2006 | Herrmann et al. |
| 7,089,085 B2 | 8/2006 | Kim |
| 7,233,841 B2 | 6/2007 | Sadighi et al. |
| 2003/0124735 A1* | 7/2003 | Nanthakumar et al. ...... 436/180 |
| 2009/0326712 A1 | 12/2009 | Marx |

OTHER PUBLICATIONS

U.S. Appl. No. 11/289,922, filed Nov. 30, 2005, 32 pages.
U.S. Appl. No. 12/242,239, filed Sep. 30, 2008, 24 pages.
Notice of Allowance dated Sep. 21, 2011 from U.S. Appl. No. 12/242,239, 15 pages.

* cited by examiner

*Primary Examiner* — Samir Ahmed
*Assistant Examiner* — Ruiping Li

(57) ABSTRACT

A method and apparatus of calibrating a vision based robotic system is disclosed. The apparatus includes a first camera, a second camera, a calibration block having an alignment mark, and a robotic tool having an alignment fiducial. The method includes using the first camera and the calibration block to determine a first camera center position, using the second camera and the calibration block to determine a second camera center position, using the second camera and the robotic tool to determine a robotic tool center position, and calculating a first camera to tool offset value.

33 Claims, 9 Drawing Sheets

```
┌─────────────────────────────┐
│ Moving the first camera to be│
│ positioned approximately above│
│ the calibration block that includes│
│ at least one alignment mark │
│            800              │
└─────────────────────────────┘

┌─────────────────────────────┐
│ Using the first camera to capture│
│ at least one image of at least one│
│ of a first plurality of camera│
│ reading points and the reticle to│
│ determine the first camera center│
│ position                    │
│            810              │
└─────────────────────────────┘

┌─────────────────────────────┐
│ Using the second camera to  │
│ capture at least one image of at│
│ least one of a second plurality of│
│ camera reading points and the│
│ reticle to determine the second│
│ camera center position      │
│            820              │
└─────────────────────────────┘

┌─────────────────────────────┐
│ Moving the robotic tool that│
│ includes at least one alignment│
│ fiducial, to be positioned  │
│ approximately above the second│
│ camera                      │
│            830              │
└─────────────────────────────┘

┌─────────────────────────────┐
│ Using the second camera to  │
│ capture at least one image of at│
│ least one of the alignment  │
│ fiducials to determine a robotic│
│ tool center position        │
│            840              │
└─────────────────────────────┘

┌─────────────────────────────┐
│ Calculating a camera to tool│
│ offset value using the first camera│
│ center position and the robotic│
│ tool center position        │
│            850              │
└─────────────────────────────┘
```

FIG. 8

CALIBRATED VISION BASED ROBOTIC SYSTEM UTILIZING UPWARD AND DOWNWARD LOOKING CAMERAS

BACKGROUND OF THE INVENTION

The use of robotic systems in automated manufacturing has become increasingly important in high technology device manufacturing. Robots can often perform repeated tasks with precision and efficiency that is generally not achievable through the use of human labor. Further, robots can be used in environments where manufacturing techniques for picking, placing, and assembling very small components make the use of human labor undesirable.

For example, this is particularly important in disk drive manufacturing where misplaced components may result in scraping during the assembly process possibly contaminating the disk drive and resulting in disk drive failure. This is particularly true for small-form-factor disk drives that require very high accuracy assembly techniques.

Robots used in disk drive manufacturing by picking, placing, and assembling components are generally well known in the art. However, in present robotic disk drive manufacturing, components are picked and placed by a robot from a taught point using a gripper, which may be prone to error.

In order to ensure precise positioning of components moved by the robot, reference points or coordinates for a desired or predetermined position of the robot's end effector, such as a gripper, may be entered into a memory of a robot controller as part of a calibration procedure. Acquiring the reference coordinates generally involves jogging the gripper to predetermined positions through a manual procedure. Arrival of the robot's end effector, such as a gripper, at the predetermined position may be confirmed by manually observing the end effector position or by having the end effector trigger a sensor.

Typically the movement of the robot's end effector for calibration is done manually. An operator must observe the location of the end effector relative to an object or target within the processing system to estimate the position of the end effector.

Thus, although attempts to improve robot accuracy are presently being made, these present techniques are typically tedious, time-consuming, undesirably expensive, involve human intervention, and often do not provide an acceptable level of accuracy. Unfortunately, for high technology device manufacturing, such as disk drive manufacturing, that requires very high accuracy to avoid scraping and contamination, these present techniques are not acceptable.

A need therefore exists for improved calibration techniques for vision based robotic systems.

BRIEF DESCRIPTION OF THE DRAWINGS

FIG. 8 is a block diagram illustrating a method of calibrating a vision based robotic system according to one embodiment of the invention.

DETAILED DESCRIPTION

In the following description, various embodiments of the invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known electrical structures, circuits, robotic tools, robotic devices, manufacturing devices, mechanical devices, methods, procedures, and components are not described in detail, or are shown in block diagram form, in order not to obscure the present invention. Furthermore, the present invention will be described in particular embodiments but may be implemented in other types of hardware, software, firmware, etc., or combinations thereof.

Figure 1:
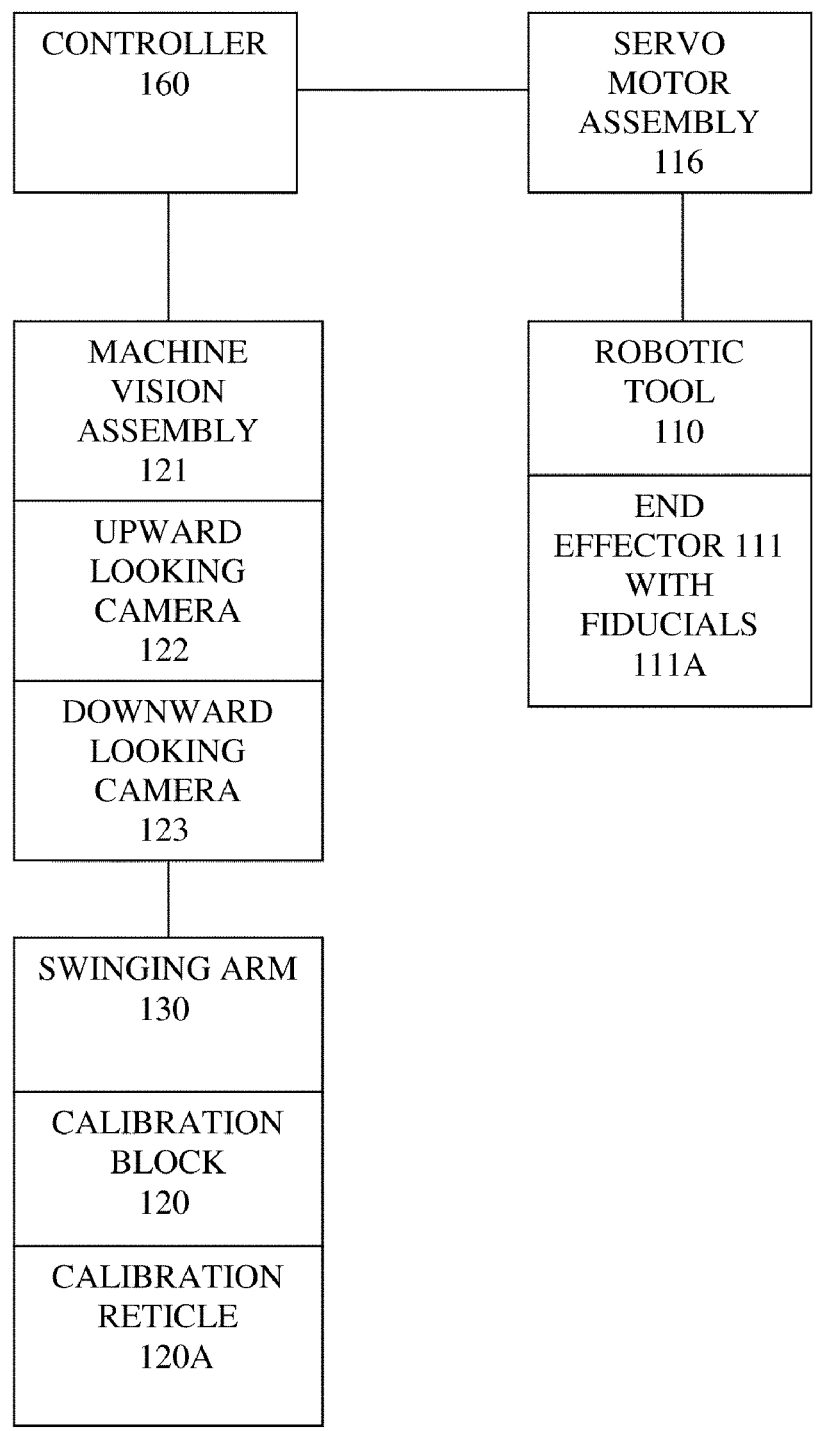
FIG. 1 shows a simplified block diagram of a calibrated vision based robotic system, according to one embodiment of the invention.

FIG. 1 shows a simplified block diagram of a calibrated vision based robotic system 100 utilizing an upward looking camera 122 and a downward looking camera 123, according to one embodiment of the invention. Calibrated vision based robotic system 100 includes a robotic tool 110 with an end effector 111 that engages a workpiece. A servo motor assembly 116 is coupled to robotic tool 110 and a controller 160. Servo motor assembly 116 is configured to move robotic tool 110. A machine vision assembly 121 includes the upward looking camera 122 that may be stationary and a moveable downward looking camera 123 that may be coupled to both robotic tool 110 and controller 160.

Figure 3:
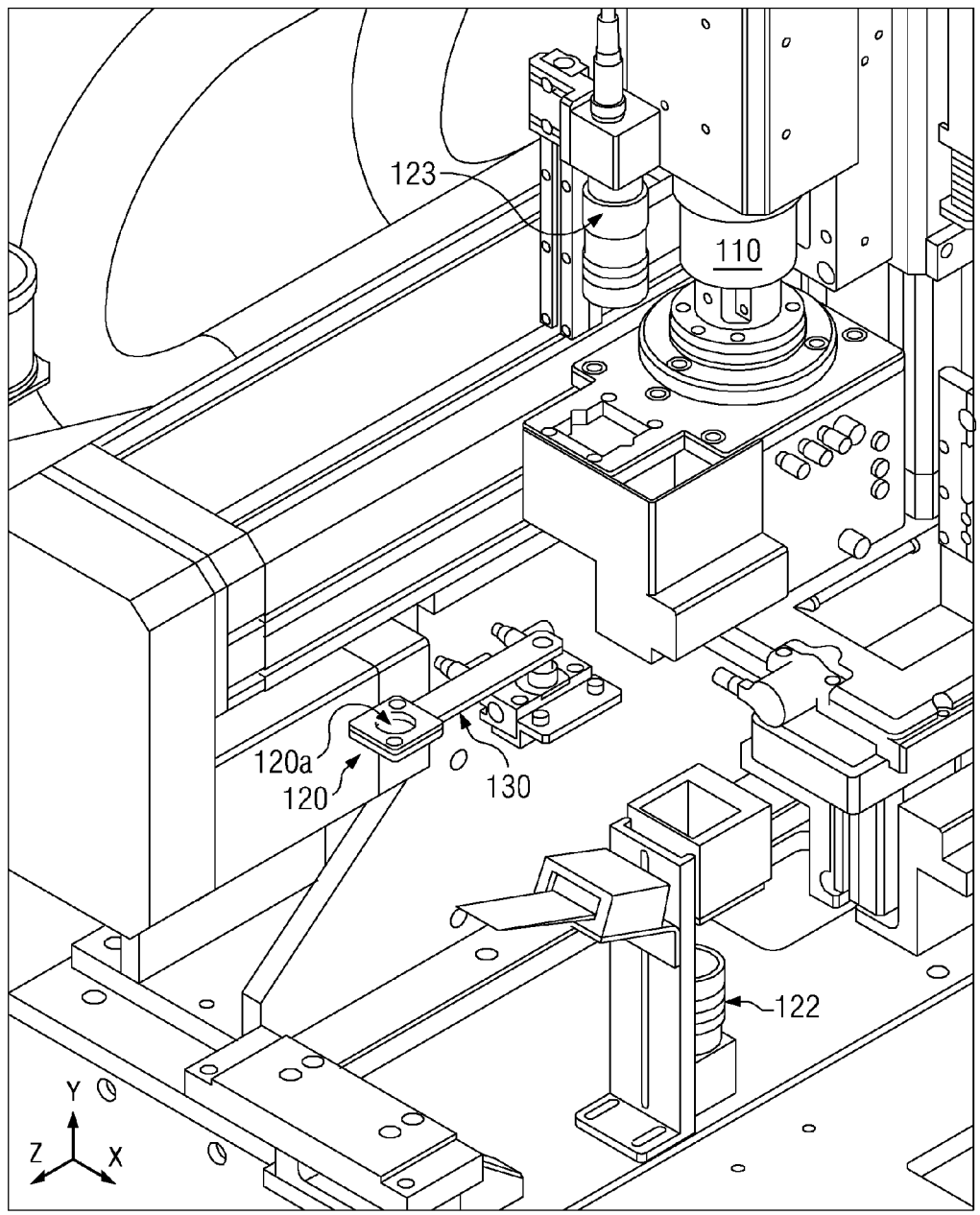
FIG. 3 is a close-up perspective view of a robotic system, according to one embodiment of the invention.
Figure 5:
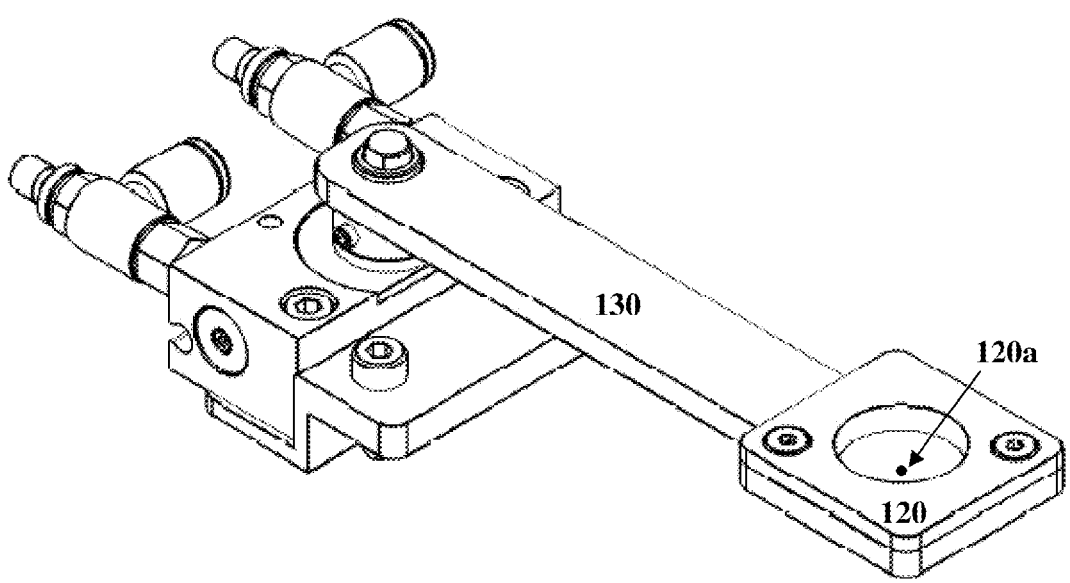
FIG. 5 is a close-up perspective view of a calibration block attached to a swinging arm apparatus according to one embodiment of the invention.

A calibration block 120 including a calibration reticle 120a may be utilized by vision based robotic system 100 for calibration purposes. Calibration block 120 may include a precision drilled hole that is located at the center of a circular recess to form calibration reticle 120a. Referring to FIG. 3 and FIG. 5, calibration block 120 is mounted on a swinging arm assembly 130.

Controller 160 coupled to servo motor assembly 116 and machine vision assembly 121 performs various operations to move downward looking camera 123 into various positions over the top of calibration block 120 in order to determine a downward looking camera 123 center position relative to a calibration reticle 120a center position. Controller 160 determines the downward looking camera 123 center position based upon capturing images of various camera reading points of calibration block 120. The downward looking camera 123 is moved in such a way as to capture images of from one to eight quadrants of the calibration block 120 within which the calibration reticle 120*a* may be positioned. The controller 160 also determines a first millimeter (mm) to pixel ratio from the capture images.

Controller 160 coupled to machine vision assembly 121 performs various operations to determine the upward looking camera 122 center position relative to the calibration reticle 120 center position based upon capturing images of calibration block 120 including calibration reticle 120*a*. Controller 160 also determines a second mm to pixel ratio from the capture images.

Controller 160 coupled to servo motor assembly 116 and machine vision assembly 121 performs various operations to move the robotic tool 110 into various positions over the top of the upward looking camera 122 in order to determine a robotic tool 110 center position relative to the calibration reticle 120*a* center position. Controller 160 determines the robotic tool 110 center position relative to the calibration reticle 120 center position based upon capturing images of various camera reading points of calibration fiducials 111*a* located on an end effector 111 attached to the robotic tool 110. See FIG. 6.

Controller 160 then calculates a downward looking camera 123 to robotic tool offset value by determining the difference between the downward looking camera 123 center position and the robotic tool 110 center position.

In essence, as will be described in more detail hereinafter, the downward looking camera 123 to robotic tool offset value is an offset value determined to be the difference between the center axis of the downward looking camera 123 and the center axis of the robotic tool 110 defined by the center axis of the calibration fiducials 111*a* located on the end effector 111 attached to the robotic tool 110. After calibration, the downward looking camera 123 to robotic tool offset value ("camera to tool offset value") provides an efficient way of calibrating the downward looking camera to tool offset value for automatic device manufacturing. Further, although a calibration reticle 120*a* is used for calibration in this embodiment, it should be appreciated that a wide variety of different alignment marks, alignment fiducials, etc. may be used instead of the calibration reticle 120*a*.

In one embodiment, robotic tool 110 may be an end effector such as a gripper. For example, the gripper may be a vacuum gripper, a two jaw gripper, a three jaw gripper, etc. However, robotic tool 110 may be another type of robotic tool as well, such as, a screwdriver, welder, vacuum head, or other well known type of robotic tools.

In one particular embodiment, robotic tool 110 may be utilized as a pick and place station to engage a workpiece and to store the workpiece to a selected portion of a device. Controller 160 may be operable to control servo motor assembly 116 to move robotic tool 110 to: align the workpiece to the selected portion of a device based upon a captured image of the portion of the device from the downward looking camera 123 of machine vision assembly 121 and may utilize the camera to tool offset value to place the aligned workpiece onto or into the selected portion of the device with a high degree of accuracy.

Figure 2:
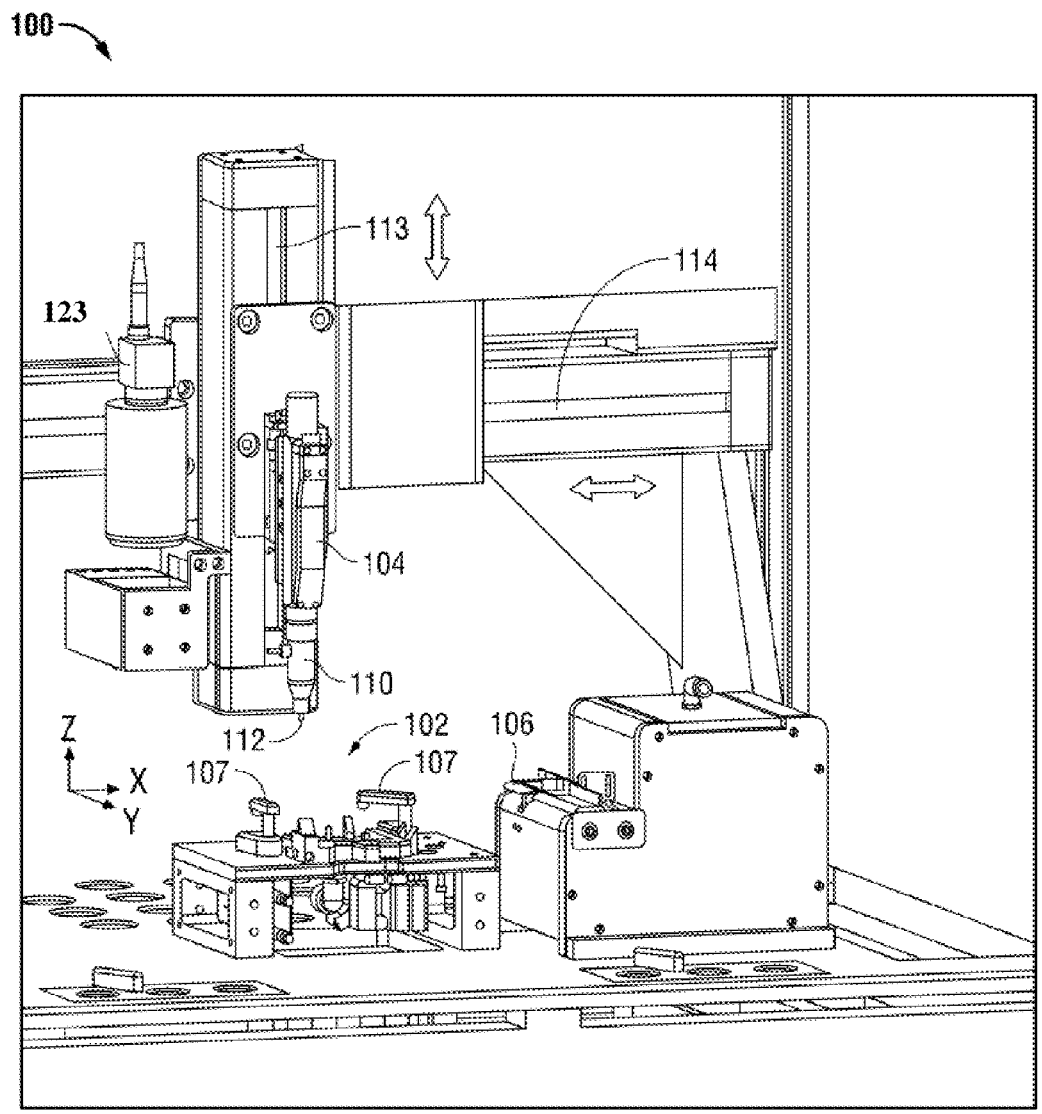
FIG. 2 illustrates a robotic system that may be utilized for picking and placing workpieces into disk drives after calibration, according to one embodiment of the invention.

With reference to FIG. 2, FIG. 2 illustrates a robotic system 100 that may be utilized for picking and placing workpieces into disk drives after calibration, according to one embodiment of the invention. In this example, after calibration, the workpieces that may be picked and placed into a disk drive may include head stack assemblies, ramps, disks, screws, fasteners, etc.

In one embodiment, robotic tool 110 may be a gripper such as a vacuum gripper, a two jaw gripper, or a three jaw gripper that may first be calibrated, as previously described, and robotic tool 110 may thereafter be used to pick and place workpieces to a disk drive.

In one embodiment, robotic tool 110 may be coupled to a position gantry that enables robotic tool 110 to be selectively moved along the x, y, z, or theta axis. As shown, the position gantry may include a servo motor assembly that may include one or more servo motors and a high resolution encoder coupled thereto. The servo motor(s) and the high resolution encoder may be coupled to a Programmable Logic Controller (PLC) to control the motion and position of robotic tool 110.

The position gantry may include a rail assembly 113 that enables robotic tool 110 to be moved along the z axis (up and down in view of FIG. 2), a rail assembly 114 that enables robotic tool 110 to be moved along the x axis (left and right in view of FIG. 2) and a rail assembly (not particularly shown) that enables robotic tool 110 to be moved along the y axis (into and out of the page in view of FIG. 2)

Robotic tool 110 may be directly mounted on the rail assembly such that robotic tool 110 may be moved along the x, y, and z axis. Further, another robotic tool 104 may also be mounted to robotic tool 110. For example, additional robotic tool 104 may be another type of end effector such as a welder, screwdriver, vacuum head, or other type of gripper.

Although the embodiment of FIG. 2 is drawn to a robotic tool including a gripper 110 with pick and place functionality, it should be appreciated that embodiment of the invention may be directed to any type of robotic tool system that may be calibrated according to the calibration features as will be hereinafter discussed.

The example of FIG. 2 is directed to a robotic tool system for disk drive assembly. In this example, an operator may clamp a hard disk drive being manufactured onto a registration nest, such as shown at 102. Registration nest 102 may include one or more clamps 107 for clamping the disk drive (not shown) onto the registration nest 102. As soon as the disk drive under manufacture is clamped onto the registration nest 102, robotic tool 110 may assist in pick and place operations as well as assembly operations.

In particular, robotic tool 110 may be a vacuum gripper, a two jaw gripper, or a three jaw gripper. Robotic tool 110 may be utilized as a pick and place station to engage a workpiece and to store the workpiece to a selected portion of the disk drive. Controller 160 may be operable to control servo motor assembly 116 to move robotic tool 110 to align the workpiece previously selected from presenting assembly 106. For example, presenting assembly 106 may store such items as head stack assemblies, ramps, disks, etc. Controller 160 operable to control the servo motor assembly 116 may move robotic tool 110 to align the workpiece to a selected portion of the disk based upon a captured image of the selected portion of the disk drive using the downward looking camera 123 of the machine vision assembly 121 and based upon the camera to tool offset value may place the aligned workpiece onto or into a selected portion of the disk drive.

The operation of the robotic tool 110 and its movement on the positioning gantry may be controlled by a programmable logic controller (PLC)-based controller 160. The PLC-based controller 160 may be coupled to the servo motor assembly 116 and the machine vision assembly 121 and the controller may be operable to: command the servo motor assembly to move the downward looking camera 123 to a position above the calibration block 120; and command the downward looking camera 123 to capture at least one image of the plurality of camera reading points of the calibration block 120 and to determine a downward looking camera 123 center position, as will be described in more detail hereinafter.

In one embodiment, after calibration and after the hard disk drive is placed on the registration nest 102, the controller 160 may command the robotic tool 110 to place workpieces from presenting assembly 106 onto the disk drive as well as to perform such functions as attaching the workpieces to the disk drive.

Although controller 160 may be implemented as a programmable logic controller, it should be understood by those of skill in the art that any suitable controller or processor may implement the functionality described herein. Indeed, the controller may comprise a plurality of microprocessors and controllers working to perform the desired functions. In one embodiment, the controller may comprise a microprocessor executing instructions, the instructions being operable to cause the microprocessor to perform the steps described herein. The instructions may be stored in any computable readable medium. In one embodiment, they may be stored on a non-volatile semiconductor memory external to the microprocessor or integrated in the microprocessor. In another embodiment, the instructions may be stored on a disk and read into a volatile semiconductor memory before execution by the microprocessor. In yet another embodiment, the controller comprises suitable logic circuitry, such as state machine circuitry.

According to one embodiment of the invention, robotic system 100 may be provided with machine vision capabilities, which reduces the chances of operator errors such as scraping errors and may prevent or at least significantly reduce particle contamination. Robotic system 100 may include a machine vision assembly 121.

In particular, machine vision assembly 121 may be operable to take various images of the calibration block 120 by commanding downward looking camera 123 to capture an image of each of the plurality of camera reading points and to determine a downward looking camera 123 center position. Machine vision assembly 121 may also be operable to assist in picking and placing workpieces and assembling such workpieces to the disk drive.

Any suitable machine vision assembly may be used. For example, a machine vision assembly from Adept Technology, Inc. of Livermore, Calif. may be used. The machine vision assembly may include, for example, a high resolution black and white progressive scan CCD (Charge Coupled Device) video camera such as the Toshiba Teli CS 8620i or the XC-HR70 available from Sony Corporation. Other video cameras may also be used and the optics thereof adapted to the specific requirements of the implementation at hand.

Referring to FIG. 3, which shows a close-up perspective view of robotic system 100 according to one embodiment of the invention. In particular, FIG. 3 shows robotic tool 110, downward looking camera 123, upward looking camera 122, and calibration block 120, including calibration reticle 120a, mounted to swinging arm 130. Note that the swinging arm 130 has yet to be rotated 90 degrees to a position above the upward looking camera 122.

Figure 4:
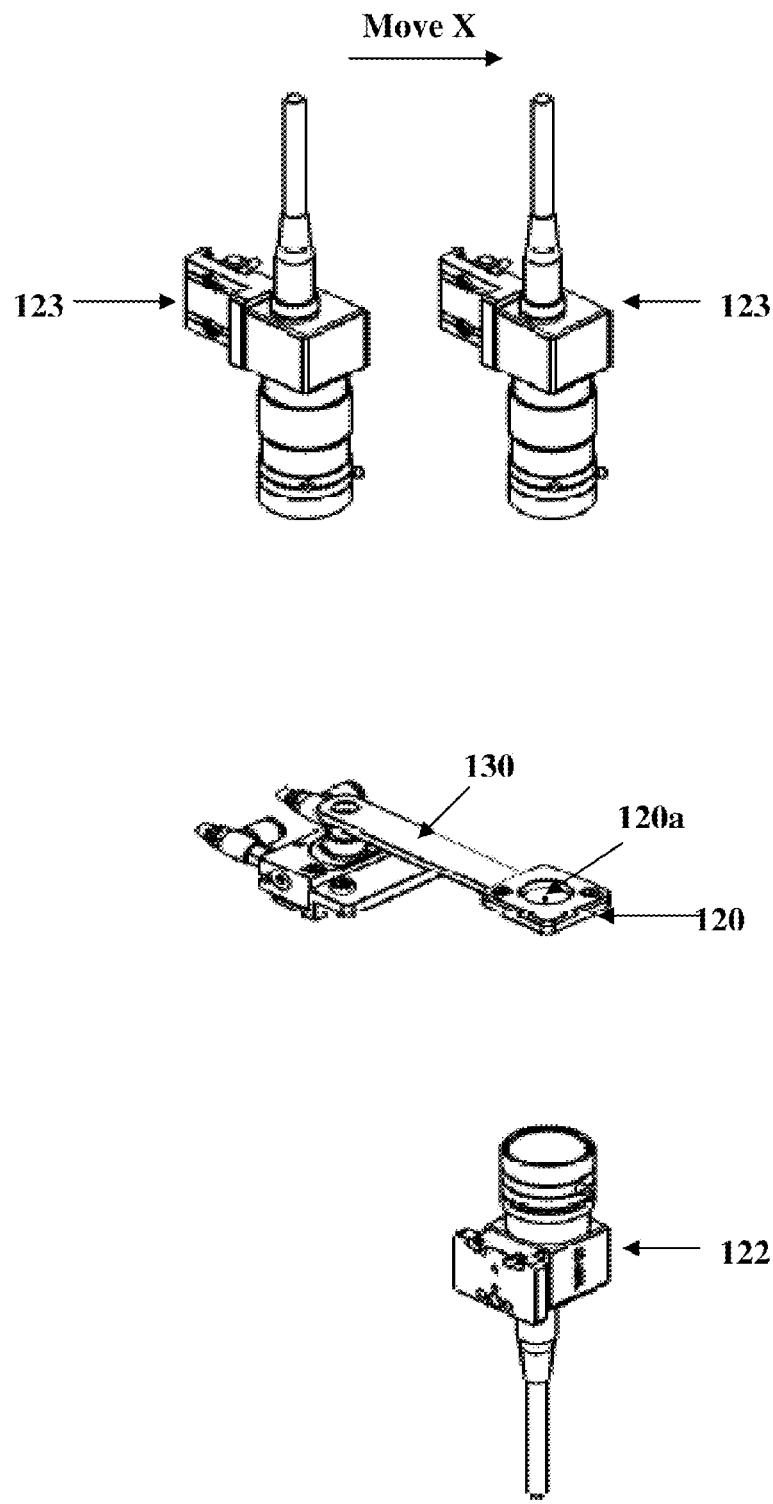
FIG. 4 is a close-up perspective view of components of a robotic system including an upward looking camera, a downward looking camera, and a calibration block attached to a swinging arm apparatus according to one embodiment of the invention.

FIG. 4 shows a close-up perspective view of robotic system 100 in which the controller 160 coupled to the servo motor assembly 116 has commanded the servo motor assembly 116 to rotate the swinging arm 130 by 90 degrees in such a way as to position the calibration block 120, including calibration reticle 120a, above the upward looking camera 122.

As previously described, controller 160 commands the servo motor assembly 116 to move and position the downward looking camera 123 above the calibration block 120 (as indicated by the arrow X). The controller 160 commands the downward looking camera 123 of machine vision assembly 121 to capture images of a first plurality of camera reading points to determine the downward looking camera 123 center position relative to the calibration reticle 120a. The controller 160 then commands the upward looking camera 122 of machine vision assembly 121 to capture an image(s) of a second plurality of camera reading points to determine the upward looking camera 123 center position relative to the calibration reticle 120a.

With reference now to FIG. 5, a perspective view of the calibration block 120 is shown in which the calibration reticle 120a is located in a circular recessed area according to one embodiment of the invention. It should be appreciated that the square-shaped embodiment of calibration block 120 is only one type of shape that may be utilized. For example, rectangular shapes, circular shapes, or any type of geometric shape may be utilized. Further, any geometric shape may be utilized for the calibration reticle 120a (cross hairs, diamond patterns, etc.) that allows for a downward looking camera 123 center position to be calculated based upon captured images of camera reading points such that a center of the geometric arrangement may be calculated.

Figure 6:
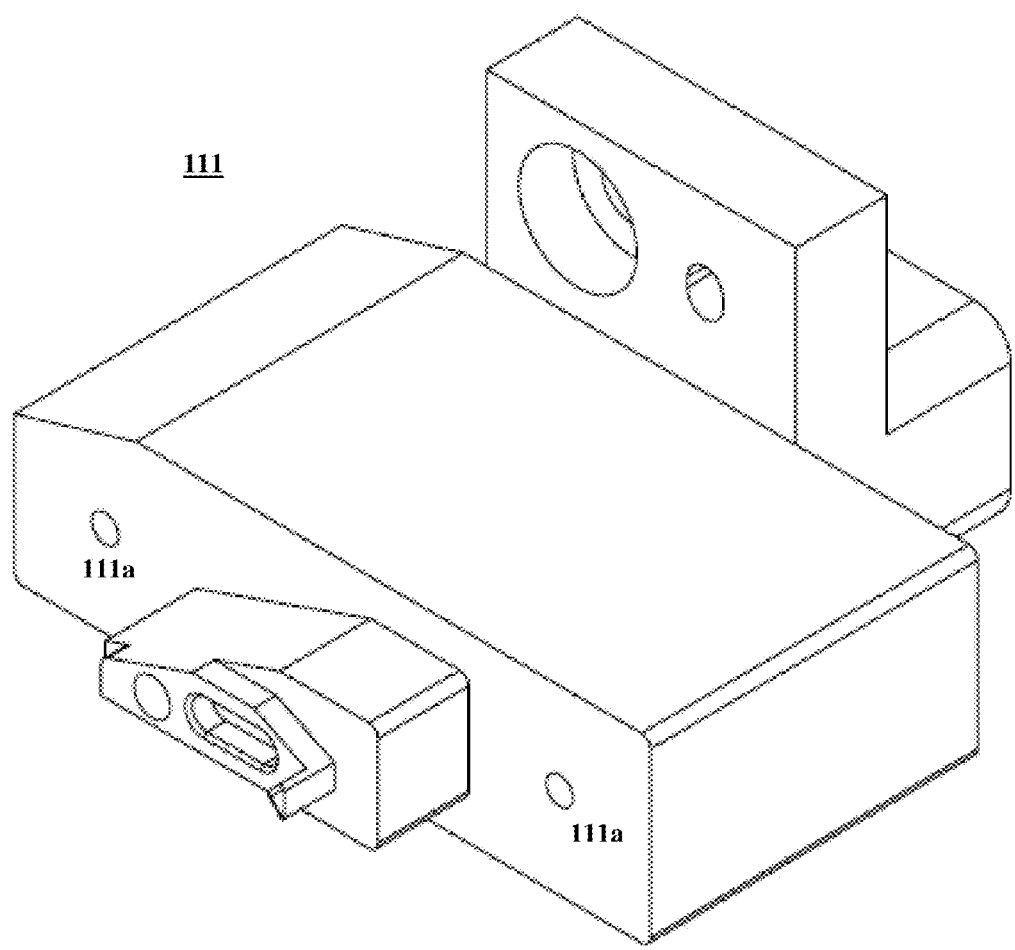
FIG. 6 is a perspective view of an end effector including alignment fiducials according to one embodiment of the invention.

With reference to FIG. 6, a perspective view of an end effector 111 including alignment fiducials 111a is shown according to one embodiment of the invention. Robotic tool 110 utilizes the end effector 111 to engage a workpiece. It should be appreciated that another type of end effector such as a welder, screwdriver, vacuum head, or other type of gripper may be used as well. In addition, many types of alignment fiducials such as differently shaped holes (e.g., circular, square, rectangular, etc.), cross hairs, diamond patterns, etc. may be used as well.

The controller 160 commands downward looking camera 123 to capture an image(s) of each quadrant(s) of the calibration block 120 to determine the downward looking camera 123 center position. Although, in various embodiments, the camera reading points may be one quadrant, two quadrants, four quadrants, or eight quadrants of the calibration block 120, it should be appreciated that other types of camera reading points may be utilized such as views of differently shaped holes (e.g., circular, square, rectangular, etc.) or views of a wide variety of differently shaped protrusions from the calibration block 120 may be utilized. In essence, any type of camera reading point may be utilized that can be captured in an image by the camera to calculate a camera center position.

Figure 7:
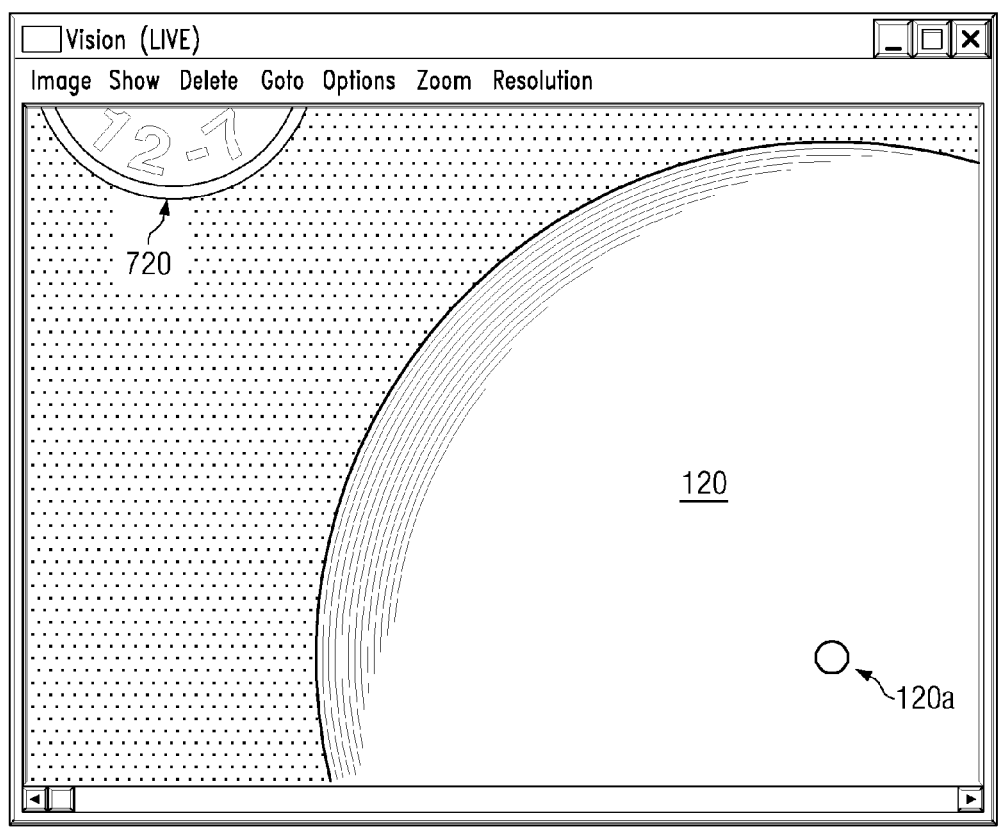
FIG. 7 is a close-up perspective view of one quadrant of a calibration block according to one embodiment of the invention.

Turning now to FIG. 7, FIG. 7 illustrates computer-based version of an image taken by the downward looking camera 123 of the machine vision assembly 121 of a camera reading point (upper left quadrant) of calibration block 120, according to one embodiment of the invention. A camera reading point of a quadrant may include the calibration reticle 120a within the camera field of view. Also note that this camera reading point includes a circular shaped object 720. In one embodiment, each quadrant of calibration block 120 is utilized to generate a camera center position. In particular, controller 160 commands downward looking camera 123 to capture an image of each corner of calibration block 120 to determine a camera center position.

In particular, in this embodiment, the camera center position is calculated by capturing an image of each of the four corners of calibration block 120 to form a square and from that controller 160 calculates a center of the square as the camera center position, as will be described in more detail hereinafter. Further, controller 160 includes a pixel to distance calibration to calculate the camera center position in terms of distance comparable to the calibration center position of the robotic tool. The camera to tool offset value may be calculated as the difference between the camera center position and the robotic tool center position.

With reference now to FIG. 8, a block diagram is shown illustrating a method of calibrating a vision based robotic system. The method consists of the operations of moving the first camera to be positioned approximately above the calibration block that includes at least one alignment mark 800. Using the first camera to capture at least one image of at least one of a first plurality of camera reading points and the alignment mark to determine the first camera center position 810. Using the second camera to capture at least one image of at least one of a second plurality of camera reading points and the alignment mark to determine the second camera center position 820. Moving the robotic tool that includes at least one alignment fiducial, to be positioned approximately above the second camera 830. Using the second camera to capture at least one image of at least one of the alignment fiducials to determine a robotic tool center position 840. Calculating a camera to tool offset value using the first camera center position and the robotic tool center position 850.

Figure 9:
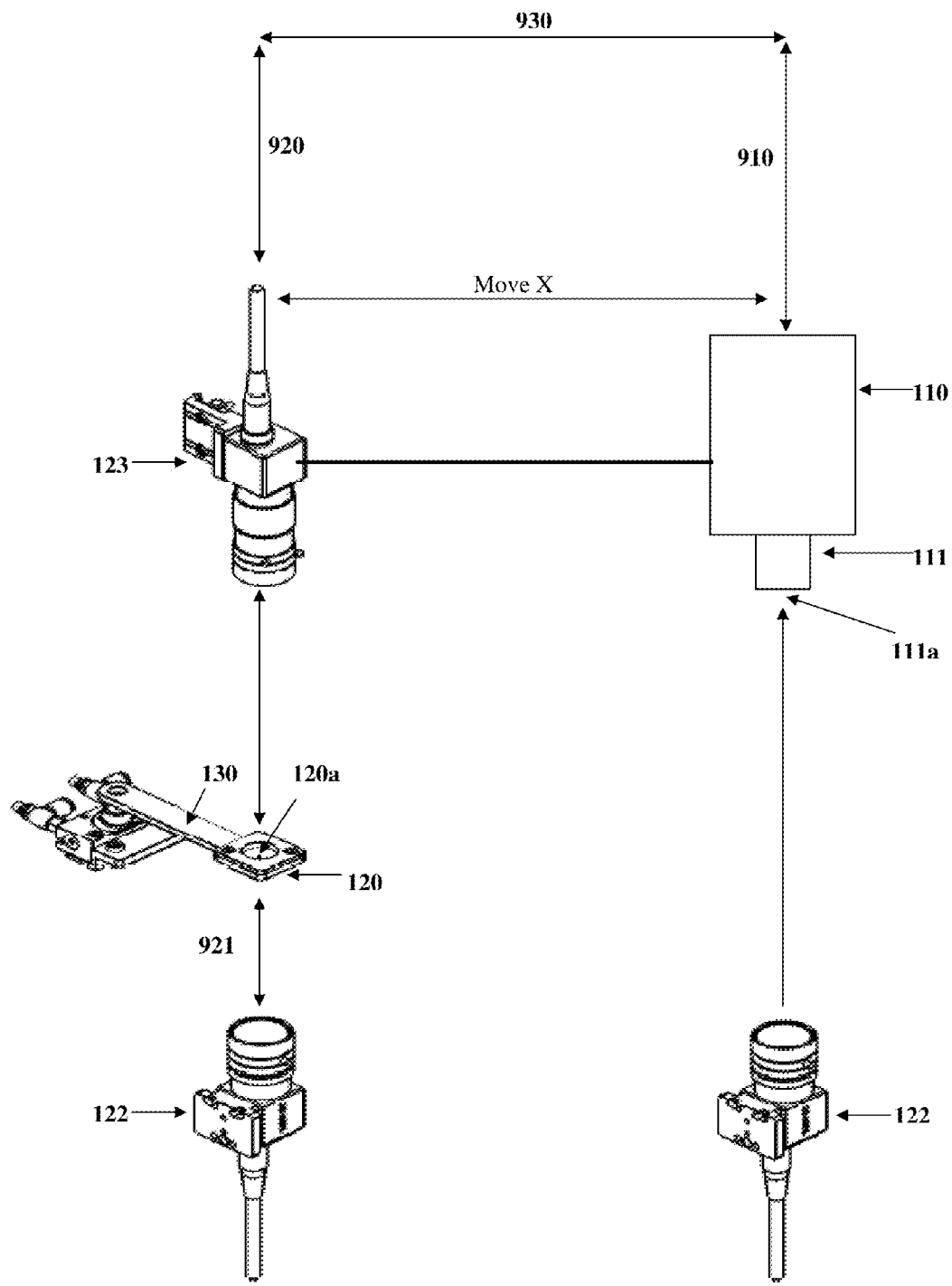
FIG. 9 is an illustration of components of a robotic system including an upward looking camera, a downward looking camera, and a calibration block attached to a swinging arm apparatus, and a robotic tool with an end effector according to one embodiment of the invention.

FIG. 9 is a diagram illustrating a robotic tool center position 910 and a downward looking camera 123 center position 920 that may be utilized to determine a camera to tool offset value 930, according to one embodiment of the invention. In particular, as previously described, controller 160 commands servo motor assembly 116 to move downward looking camera 123 to a position over the calibration block 120 to determine a downward looking camera 123 center position 920 relative to the calibration reticle 120a. Further, controller 160 commands upward looking camera 122 of machine vision assembly 121 to capture images of the calibration block 120 in order to determine the upward looking camera 122 center position 921 relative to the calibration reticle 120a. Finally, controller 160 commands the servo motor assembly 116 to move the robotic tool 110 to a position over the upward looking camera 122 to capture images of the end effector 111 fiducials 111a in order to determine the robotic tool 110 center position 910 relative to the calibration reticle 120a. In various embodiments, upward looking camera 122 may remain in a fixed position. In various embodiments, downward looking camera 123 and robotic tool 110 are fixed relative to one another and move in the X direction together as one unit.

Based upon the robotic tool center position 910 and the downward looking camera center position 920, controller 160 may determine a camera to tool offset value 930, in which the camera to tool offset value 930 is calculated as the difference between the robotic tool center position 910 and the downward looking camera center position 920. As shown in FIG. 9, this difference value can be seen as the camera to tool offset value 930.

Thus, the calibration of the robotic system is based upon the camera to tool offset value which is the offset difference between the axis of the downward looking camera and the axis of the robotic tool. The axis of the robotic tool may be referred to as the tool center point. Thus, a relationship between the tool center point and the axis of the downward looking camera 123 is determined and is represented by the difference value 930.

This difference value 930 can then be utilized by controller 160 to accurately utilize robotic tool 110 for picking and placing workpieces, such as head stack assemblies, ramps, and disks, to a disk drive, based upon captured images of the selected portion of the disk drives from the downward looking camera 123 to which workpieces are to be placed or assembled and utilizing the camera to tool offset value to accurately place or assemble the workpiece onto or into the selected portion of the disk drive.

By calibrating robotic tool 110 utilizing the camera to tool offset value, robotic tool 110 may very accurately pick and place head stack assemblies and other items to a disk drive and very accurately assemble these items on the disk drive.

Further, these methods and techniques for utilizing these calibration techniques provide an efficient calibration process that may not require human intervention for achieving a highly accurate camera to tool offset value which may be utilized by the robotic system for picking, aligning, and assembling disk drive workpieces to a disk drive in a very precise manner.

An operator or technician may simply utilize a "one-button click" to instruct controller 160 to determine the camera to tool offset value in order to efficiently calibrate the robotic tool 110 without the use of operator intervention. The robotic tool may be calibrated either during the first time the robotic system is turned on or during any change or repair of parts.

Referring to FIG. 7, calibration block 120 may have a precisely drilled hole to form the calibration reticle 120a. Additionally, in various embodiments calibration block 120 may have fine drilled holes 720 at four corners to allow machine vision assembly 121 with downward looking camera 123 and upward looking camera 122 to take images to calculate a very accurate axis of the camera to determine a very accurate offset value with respect to the axis of the robotic tool in world coordinates.

As previously described, utilizing these very detailed determinations of the robotic tool center position and the downward looking camera center position, a highly accurate camera to tool offset value may be determined for use in pick and place functionality as well as assembly functionality utilizing the robotic tool.

In particular, based upon this highly accurate calibration determination utilizing the camera to tool offset value, the robotic tool may utilize a gripper to perform pick and place operations for workpieces, such as, head stack assemblies, ramps, disks, etc., to a disk drive, and also such that they can be assembled by a robotic tool.

By utilizing the calibrated vision based robotic system and methods previously described, many human errors involved in disk drive manufacturing by robotic systems may be reduced resulting in a reduction of disk drive contamination. Also, because the controller automatically calibrates the robotic tool, previously required time consuming human based calibration is eliminated, thus, reducing the time required for disk drive manufacturing. Further, the overall amount of time for disk drive manufacturing is reduced by the improved accuracy of the calibrated vision based robotic system. Accordingly, disk drives may be manufactured in a more accurate and time reduced fashion.

It should be appreciated by those with skill in this art that, although embodiments of the invention have been previously described with reference to particular robotic device components, that the embodiments of the invention may be utilized with a wide variety of differing types of robotic devices having different types of robotic tools, calibration devices, machine vision assemblies, workpieces, and manufactured devices, and that the details disclosed in describing the embodiments of the invention are not intended to limit the scope of the invention as set forth in the appended claims.

The invention claimed is:

1. A method of calibrating a vision based robotic system comprising:

moving a first camera to be positioned approximately above a calibration block including at least one alignment mark;

capturing, using the first camera, at least one image of at least one of a first plurality of camera reading points and the at least one alignment mark to determine a first camera center position;

capturing, using a second camera, at least one image of at least one of a second plurality of camera reading points and the at least one alignment mark to determine a second camera center position;

moving a robotic tool, including at least one alignment fiducial, to be positioned approximately above the second camera;

capturing, using the second camera, at least one image of at least one of the alignment fiducials to determine a robotic tool center position; and calculating a first camera-to-tool offset value.

2. The method of claim 1, wherein the at least one alignment mark includes a reticle.

3. The method of claim 1, wherein the controller further calculates a first camera-pixel-to-distance ratio and a second camera-pixel-to-distance ratio.

4. The method of claim 1, wherein the first camera-to-tool offset value is calculated as the difference between the first camera center position and the robotic tool center position.

5. The method of claim 3, wherein the controller calculates the first camera center position using the first camera-pixel-to-distance ratio.

6. The method of claim 1, wherein the first camera center position is calculated by forming a geometric arrangement using the at least one image of at least one of a first plurality of camera reading points and the at least one alignment mark and calculating a center of the geometric arrangement.

7. The method of claim 1, wherein the first plurality of camera reading points includes at least four points on the calibration block, and the first camera center position is calculated by capturing an image of each of the four points to form a square and calculating a center of the square.

8. The method of claim 1, wherein the robotic tool is one of a vacuum gripper, a two jaw gripper, or a three jaw gripper.

9. The method of claim 1, further comprising:

utilizing the robotic tool as a pick and place station to engage a workpiece and to store the workpiece to a selected portion of a device;

aligning the workpiece with the robotic tool to the selected portion of the device based upon a captured image of the selected portion of the device using the first camera and the first camera-to-tool offset value; and moving the robotic tool to the device to place the aligned workpiece onto or into the selected portion of the device.

10. The method of claim 9, wherein the device is a disk drive.

11. The method of claim 9, wherein the workpiece is one of a head stack assembly, a ramp, or a disk.

12. A calibrated vision based robotic system comprising:

a robotic tool, including at least one alignment fiducial, to engage a work piece;

a servo motor assembly configured to move the robotic tool;

a machine vision assembly including a first camera and a second camera;

a calibration block including at least one alignment mark; and a controller coupled to the servo motor assembly and the machine vision assembly, the controller operable to:

command the servo motor assembly to move the first camera to be positioned approximately above the calibration block;

command the first camera to capture at least one image of at least one of a first plurality of camera reading points and the at least one alignment mark to determine a first camera center position;

command the second camera to capture at least one image of at least one of a second plurality of camera reading points and the at least one alignment mark to determine a second camera center position;

command the servo motor assembly to move the robotic tool to be positioned approximately above the second camera;

command the second camera to capture at least one image of at least one of the alignment fiducials to determine a robotic tool center position; and calculate a first camera-to-tool offset value.

13. The robotic system of claim 12, wherein the at least one alignment mark includes a reticle.

14. The robotic system of claim 12, wherein the controller further calculates a first camera-pixel-to-distance ratio and a second camera-pixel-to-distance ratio.

15. The robotic system of claim 12, wherein the first camera-to-tool offset value is calculated as the difference between the first camera center position and the robotic tool center position.

16. The robotic system of claim 14, wherein determining the first camera center position includes utilizing the first camera-pixel-to-distance ratio.

17. The robotic system of claim 12, wherein the first camera center position is calculated by forming a geometric arrangement using the at least one image of at least one of the first plurality of camera reading points and the at least one alignment mark and calculating a center of the geometric arrangement.

18. The robotic system of claim 12, wherein the first plurality of camera reading points includes at least four points on the calibration block, and the first camera center position is calculated by capturing an image of each of the four points to form a square and calculating a center of the square.

19. The robotic system of claim 12, wherein the robotic tool is one of a vacuum gripper, a two jaw gripper, or a three jaw gripper.

20. The robotic system of claim 12, wherein the robotic tool is utilized as a pick and place station to engage the workpiece and to store the workpiece to a selected portion of a device, the controller operable to control the servo motor assembly to move the robotic tool to align the workpiece to the selected portion of the device based upon a captured image of the selected portion of the device using the first camera and the first camera-to-tool offset value and place the aligned workpiece onto or into the selected portion of the device.

21. The robotic system of claim 20, wherein the device is a disk drive.

22. The robotic system of claim 12, wherein the workpiece is one of a head stack assembly, a ramp, or a disk.

23. In a calibrated vision based robotic system, a non-transitory computer-readable medium having stored thereon instructions, which, when executed by a computer, cause the computer to perform operations comprising:

moving a first camera to be positioned approximately above a calibration block including at least one alignment mark;

capturing, using the first camera, at least one image of at least one of a first plurality of camera reading points and the at least one alignment mark to determine a first camera center position;

capturing, using a second camera, at least one image of at least one of a second plurality of camera reading points and the at least one alignment mark to determine a second camera center position;

moving a robotic tool, including at least one alignment fiducial, to be positioned approximately above the second camera;

capturing, using the second camera, at least one image of at least one of the alignment fiducials to determine a robotic tool center position; and calculating a first camera-to-tool offset value.

24. The computer-readable medium of claim 23, wherein the at least one alignment mark includes a reticle.

25. The computer-readable medium of claim 23, wherein the operations further comprise calculating a first camera-pixel-to-distance ratio and a second camera-pixel-to-distance ratio.

26. The computer-readable medium of claim 23, wherein the first camera-to-tool offset value is calculated as the difference between the first camera center position and the robotic tool center position.

27. The computer-readable medium of claim 25, wherein the first camera center position is calculated using the first camera-pixel-to-distance ratio.

28. The computer-readable medium of claim 23, wherein the first camera center position is calculated by forming a geometric arrangement using the at least one image of at least one of the first plurality of camera reading points and the at least one alignment mark and calculating a center of the geometric arrangement.

29. The computer-readable medium of claim 23, wherein the first plurality of camera reading points includes at least four points on the calibration block, and the first camera center position is calculated by capturing an image of each of the four points to form a square and calculating a center of the square.

30. The computer-readable medium of claim 23, wherein the robotic tool is one of a vacuum gripper, a two jaw gripper, or a three jaw gripper.

31. The computer-readable medium of claim 23, wherein the operations further comprise:

utilizing the robotic tool as a pick and place station to engage a workpiece and to store the workpiece to a selected portion of a device;

aligning the workpiece with the robotic tool to the selected portion of the device based upon a captured image of the selected portion of the device using the first camera and the first camera-to-tool offset value; and moving the robotic tool to the device to place the aligned workpiece onto or into the selected portion of the device.

32. The computer-readable medium of claim 31, wherein the device is a disk drive.

33. The computer-readable medium of claim 31, wherein the workpiece is one of a head stack assembly, a ramp, or a disk.

* * * * *